United States Patent
Guim Bernat et al.

(10) Patent No.: US 11,366,588 B2
(45) Date of Patent: Jun. 21, 2022

(54) TIER-AWARE READ AND WRITE

(71) Applicant: Intel Corporation, Santa Clara, CA (US)

(72) Inventors: Francesc Guim Bernat, Barcelona (ES); Nicolae O. Popovici, Bretten (BS); Charles A. Giefer, Seattle, WA (US); Gaspar Mora Porta, Santa Clara, CA (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 15/640,943

(22) Filed: Jul. 3, 2017

(65) Prior Publication Data

US 2019/0004701 A1    Jan. 3, 2019

(51) Int. Cl.
*G06F 3/06* (2006.01)
*H04L 69/22* (2022.01)
*H04L 67/1097* (2022.01)
*H04L 67/61* (2022.01)

(52) U.S. Cl.
CPC .............. *G06F 3/061* (2013.01); *G06F 3/064* (2013.01); *G06F 3/0649* (2013.01); *G06F 3/0659* (2013.01); *G06F 3/0685* (2013.01); *H04L 67/1097* (2013.01); *H04L 67/322* (2013.01); *H04L 69/22* (2013.01); *G06F 2206/10* (2013.01)

(58) Field of Classification Search
CPC ...... G06F 3/061; G06F 3/0685; G06F 3/0659; G06F 3/064; G06F 3/0649; H04L 67/1097; H04L 67/322; H04L 69/22
USPC ......................................................... 711/101
See application file for complete search history.

(56) References Cited

U.S. PATENT DOCUMENTS

| | | | | |
|---|---|---|---|---|
| 8,548,900 B1 * | 10/2013 | Glackin | ................. | G06Q 40/06 705/37 |
| 10,331,569 B2 * | 6/2019 | Florea | ................. | G06F 12/0879 |
| 2017/0195259 A1 * | 7/2017 | Florea | ..................... | H04L 69/22 |
| 2017/0351555 A1 * | 12/2017 | Coffin | ................... | G06F 9/5016 |

* cited by examiner

*Primary Examiner* — Hua J Song
(74) *Attorney, Agent, or Firm* — Patent Capital Group

(57) ABSTRACT

A fabric interface apparatus, including: a fabric interface logic to communicatively couple to a fabric; a data interface to communicatively couple to a compute platform including memory resources in at least two memory tiers; and a tier-aware read/write engine (TARWE) to: receive an incoming packet via the fabric; parse a header of the incoming packet to identify a hint for directing the incoming packet to a preferred memory tier; and write the incoming packet to the preferred memory tier.

23 Claims, 10 Drawing Sheets

TIER-AWARE READ AND WRITE

FIELD OF THE SPECIFICATION

This disclosure relates in general to the field of distributed computing, and more particularly, though not exclusively, to a system and method for tier-aware read and write.

BACKGROUND

As system sizes have scaled to higher processor counts, the network becomes increasingly important.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
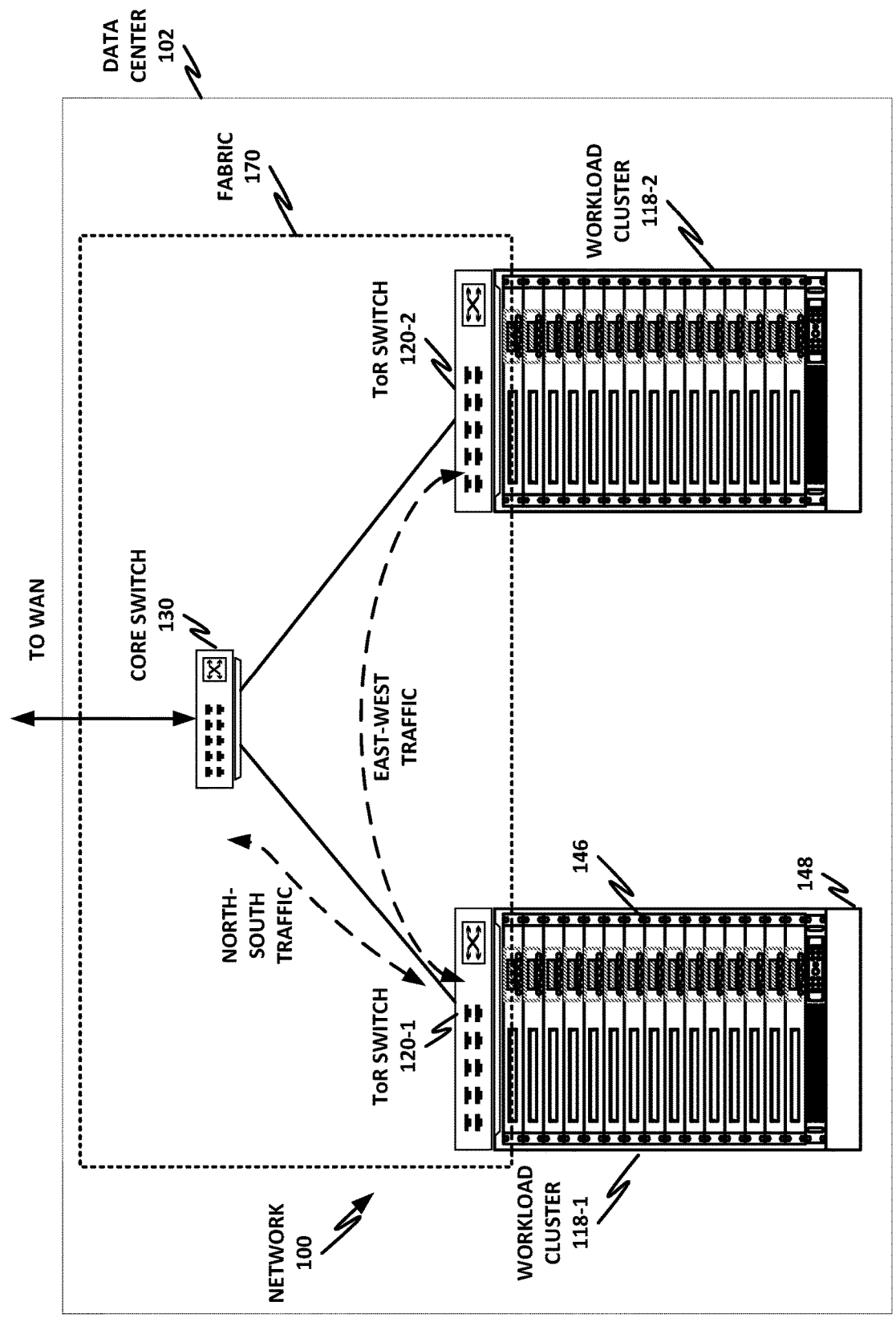
FIG. 1 is a network-level diagram of a data center, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the modern data center, disaggregation of resources provides for a high degree of configurability and highly efficient use of resources. Rather than overbuilding individual nodes to meet a greatest theoretical possible demand, resource pools can be placed throughout a data center, and resources can be allocated to composite compute nodes on demand.

Similarly, in the context of high-performance computing (HPC), very computationally intensive problems can be solved in much reduced time by employing massively parallel computations.

In these contexts, as well as in other contexts, latency and bandwidth between nodes or resources is a consideration that influences the overall efficiency of the large computing platform. In particular, it is advantageous to provide a fabric for interconnecting nodes and resources that, as much as possible, enables the various nodes and resources to communicate at such high bandwidth and low latency that they can work together as though they were part of a single computing platform.

For example, direct data input/output (DDIO) is a memory hierarchy (cache) placement mechanism for I/O that improves fabric performance in terms of both latency and bandwidth. DDIO, which is especially useful for reducing latency, realizes performance gains by implementing data optimizations such as placing caches close to the processing cores to ensure higher bandwidth and lower latency. Thus, data can be consumed very quickly, as compared with other placement mechanisms.

For example, in an example of DDIO, a PCIe fabric interface communicates with a data center or HPC platform, receiving data from other nodes. On the assumption that incoming data are to be consumed quickly by the processing core, the fabric interface may not place the incoming data into main memory, where the core can only access the data by executing a computationally expensive read from memory. Because a read from main memory can take hundreds of processor cycles, placing the data in main memory can become a substantial performance bottleneck to the system. To alleviate this bottleneck, DDIO may instead write the data directly into a high-bandwidth memory, a last level cache, or an on-die cache such as L2 cache. Thus, when the processor is ready to consume the data, it can retrieve the data directly from a high-bandwidth memory or cache, and thus complete its processing in only a few cycles, rather than hundreds of cycles.

In some examples of DDIO, the expectation is that data that have just been received will be consumed by the application very shortly. However, if the expectation fails, then a performance bottleneck may once again be encountered. For example, if data that are not to be consumed until later come into the fabric interface, the PCIe fabric interface may place the data into a high-bandwidth or low latency memory, and it may sit there for many cycles while other data are being processed. Not only does this unnecessarily consume space in the valuable high-speed memories, but in some cases, the data may end up being flushed back out to main memory anyway. In that case, cache space is consumed without any attendant benefit.

One challenge is that certain existing implementations of technologies such as DDIO are intentionally transparent to the software stack. An application need not be concerned with the details of how or when data are moved around within the system. Rather, the software stack simply accesses mapped memory locations, and the details of getting the data from remote nodes or resources are handled transparently by the fabric interface.

While this transparency and encapsulation are good from a simplicity standpoint, it is sometimes advantageous to also allow greater flexibility and control. In some cases, the application . . . may have visibility into which communications/messages have locality or are on the critical latency path of the distributed computation. Thus, it is advantageous to provide a technology such as DDIO with additional flexibility, which may allow an application to tag a datum or data structure with a priority such as "hot," "warm," or "cold." For example, hot data may need to be placed directly into on-die L2 cache. Warm data may be placed in LLC or HBM. Cold data that are not to be consumed until later may safely be placed in main memory or in some other less immediately accessible memory location.

It is also advantageous to provide a DDIO-like technology that can be implemented outside of discrete PCIe fabric interface cards. In many contemporary platforms, particularly those that are specially designed for use in data centers or HPC contexts, the fabric interface may be closely integrated with an on-die interconnect. Thus, the on-die interconnect may expose a cache that can be accessed by peer cores within the same die. This can improve latency and bandwidth between the various cores, and the improvements can be further enhanced by providing the ability for an application to provide "hints" or tags that can shape cache and memory management. In particular, the application may distinguish between different classes of data, such as hot, warm, or cold data, and may thus ensure that hot and warm data are readily accessible when needed, while also ensuring that cold data do not unnecessarily clutter high-speed caches.

Some existing fabric architectures provide mechanisms to allow the fabric interface to treat different types of data with different allocation policies in the memory hierarchy. For example, data placement may be determined according to message size, and the fabric interface may set some metadata bits associated with memory requests that can be used by a caching agent (CA) to provide better cache management, such as temporal versus non-temporal data or allocate versus non-allocate. It is advantageous to extend this architecture to allow cache management at the application level, and outside of or in conjunction with the heuristic architecture. This allows an application to explicitly tag a packet with metadata or attributes to provide highly accurate hints about the desired speed of processing the data.

To realize these advantages, the present specification provides a system and method that allow for an application to specify a class of packet (such as hot, warm, or cold, by way of nonlimiting example), and may also specify a preferred location for the data (such as L1 or L2, LLC, HBM, or main memory, by way of nonlimiting example). The application may also provide additional hints or attributes, such as quality of service (QoS) hints, which can describe whether the data are temporal versus non-temporal, or whether they have a particular priority. These can be used by the fabric interface and the CA together to provide better cache management.

By providing an improved memory architecture, technologies such as DDIO, which already provide substantial benefits, can be significantly improved by avoiding situations such as one where cold data end up unnecessarily polluting more precious levels of the memory hierarchy, while possibly evicting data that may need to be consumed quickly.

In order to realize these advantages, existing architecture, such as to the fabric interface, may be extended. The fabric interface may be extended to expose novel "put" and "get" commands. The put command may be used to send data from the local node to a remote node. The get command may be used to get data from a remote node to the local node. The novel put and get commands may include existing commands, and may also be provided with new fields, including by way of nonlimiting example:

A data class for the message (e.g., hot, warm, or cold).
An optimal intended target for where the data should be stored (e.g., L1 or L2, LLC, HBM, DDR, or even a remote memory such as persistent fast memory (PFM) or remote direct memory access (RDMA)).
QoS hints. For example, these may indicate when the data may be safely evicted.
A process ID, which may be used in cases where the data are to be stored in a core where a given process ID is running.

In one example, the data class and the storage target may be enumerated integer values which may have a specific meaning crafted to the particular technology on which they are implemented. The QoS hints may be a mechanism to expose to applications hints that are implemented in the fabric interface, but that are provided to the CAs for better cache management. Note that currently, the CA performs some cache management based on static characteristics of the message itself, but in many cases does not receive explicit information from the application. This field may also depend on the context of the functionalities of the node on which the architecture is implemented. An example of a hint may include the number of cycles that the data conveyed in the message should be stored in the LLC, after which it is unlikely that the data will be needed in the LLC anymore. In some examples, QoS hints may be provided in a structured format, such as a JavaScript Object Notation (JSON) format, an XML format, or some other structured data format. The process ID may be an ordinary integer process ID, and may be used to identify a process to map the data to a target processor or core. For example, this may be used in a case where the data are to be stored directly in L1 or L2 cache of the core, and thus the process ID can be mapped to the particular core hosting that process, and the data can be stored in the appropriate cache for that core.

In cases where the fabric interface is integrated into the die, it may also be extended with logic that is able to process these messages and take a corresponding action based on the foregoing fields. For example, an integrated fabric interface may determine whether data fetched from a remote node should go to the LLC or to main memory. When the fabric interface is connected to the node through a PCIe interface, the PCIe agents may be extended to provide similar functionality.

In some embodiments, the fabric interface may be extended to support the novel flows described herein, and to provide the cache and memory operations described.

A system and method for tier-aware read and write will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a data center 102, according to one or more examples of the present specification. Data center 102 may be, by way of nonlimiting example, a traditional enterprise data center, an enterprise "private cloud," or a "public cloud," providing services such as infrastructure as a service (IaaS), platform as a service (PaaS), or software as a service (SaaS).

Data center 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® OmniPath™, TrueScale™, Ultra Path Interconnect (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as OmniPath™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
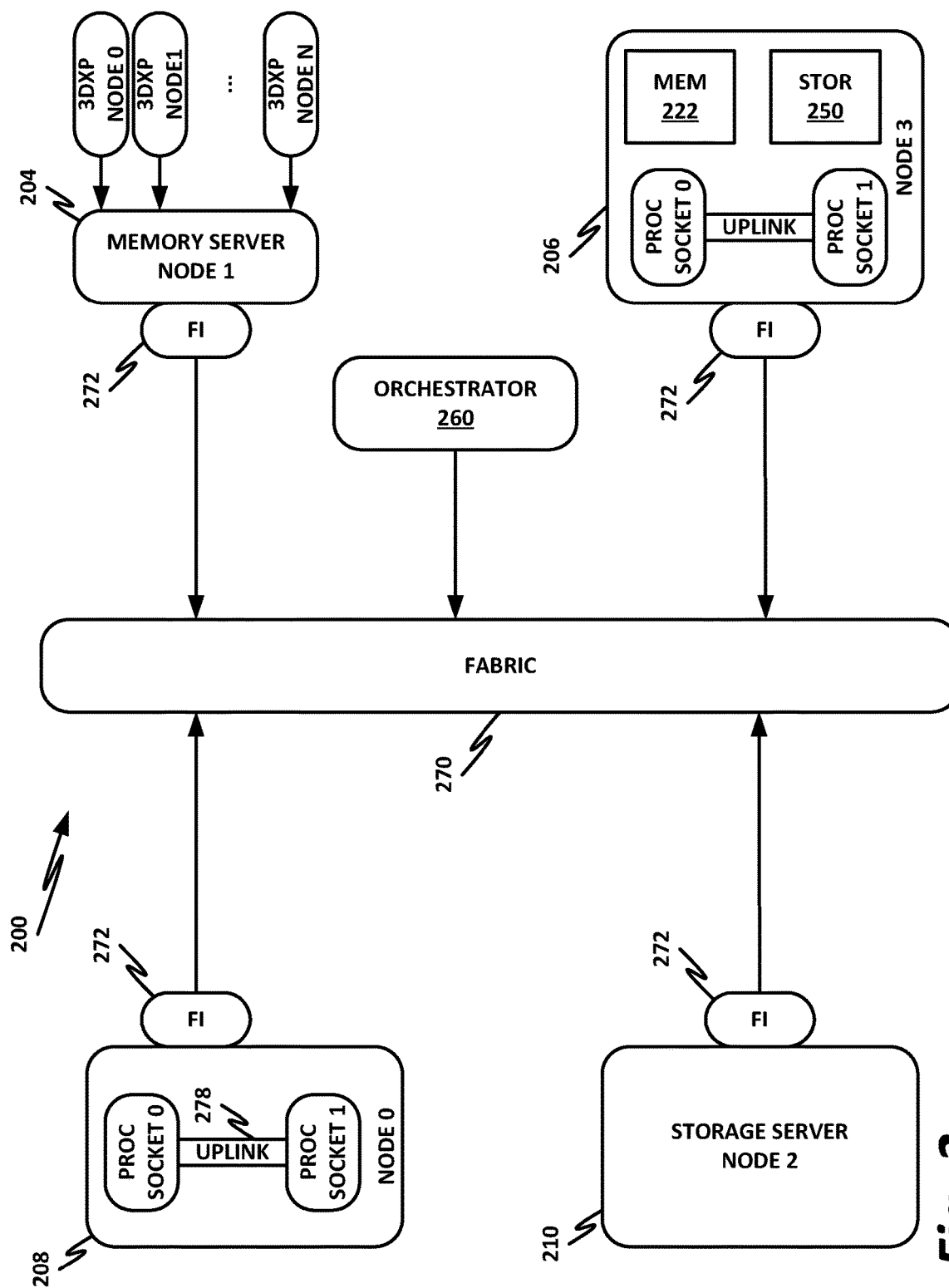
FIG. 2 is a block diagram of a data center, according to one or more examples of the present specification.

FIG. 2 is a block diagram of a data center 200, according to one or more examples of the present specification. Data center 200 may be, in various embodiments, the same data center as network 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® OmniPath™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface for connecting to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
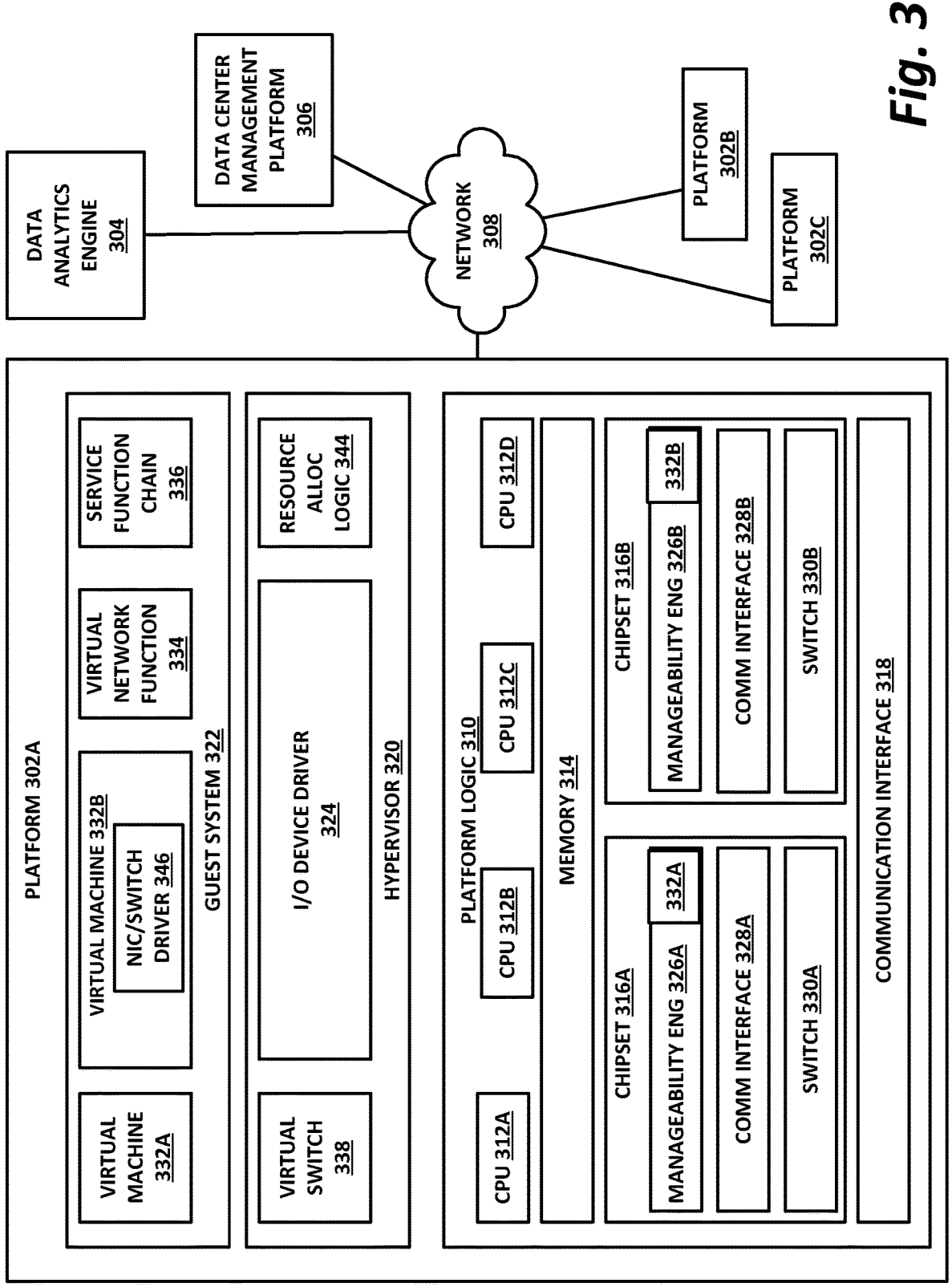
FIG. 3 illustrates a block diagram of components of a computing platform, according to one or more examples of the present specification.

FIG. 3 illustrates a block diagram of components of a computing platform 302A, according to one or more examples of the present specification. In the embodiment depicted, platforms 302A, 302B, and 302C, along with a data center management platform 306 and data analytics engine 304 are interconnected via network 308. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chipset 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 will manage and/or which telemetry data will be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 512 or memory 514) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

SFC 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems. Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
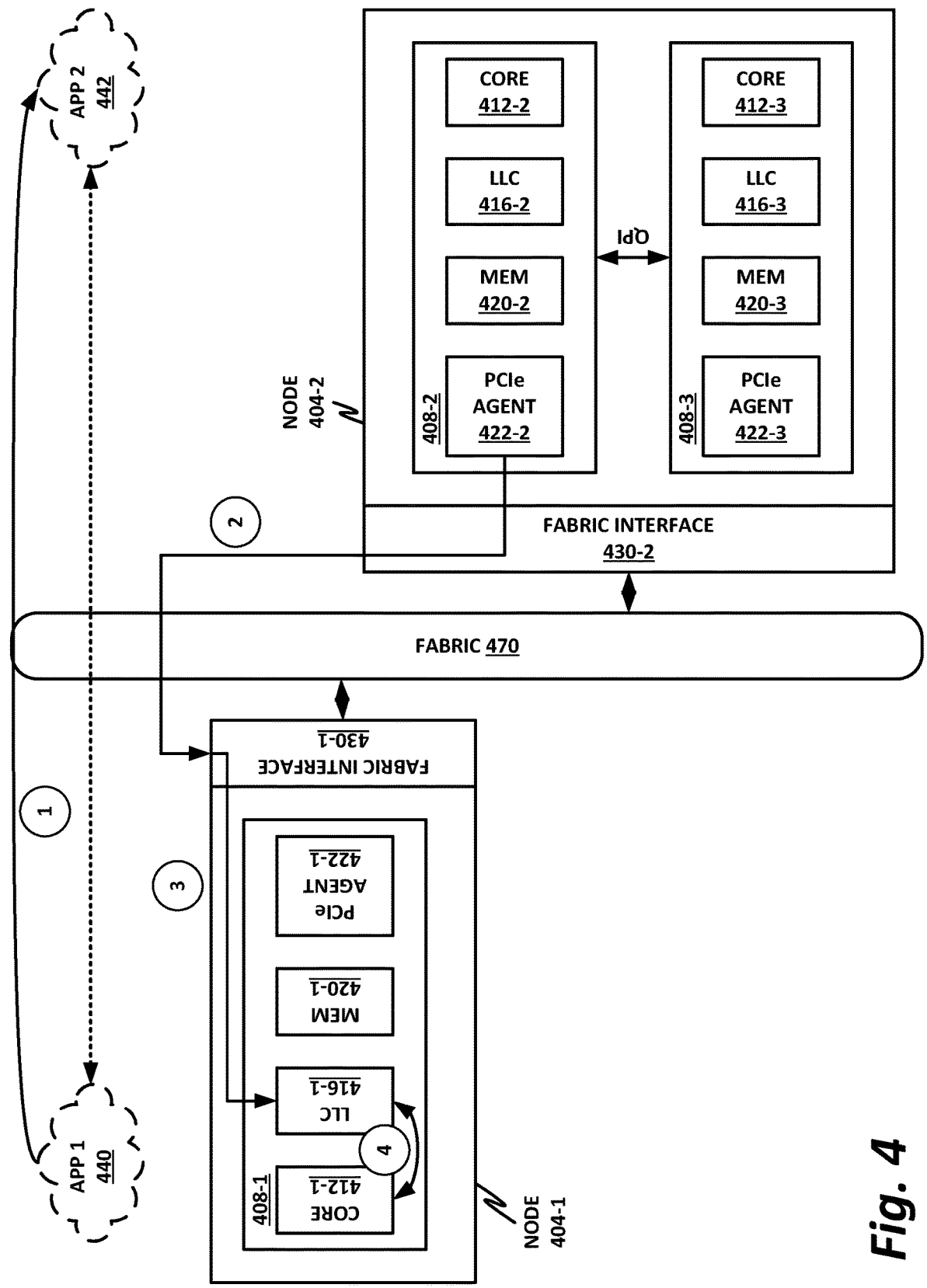
FIG. 4 is a block diagram of selected aspects of a data center, according to one or more examples of the present specification.

FIG. 4 is a block diagram of selected aspects of a data center, according to one or more examples of the present specification. In the example of FIG. 4, application 1 440 running on node 404-1 communicates with application 2 442 running on node 404-2.

Node 1 404-1 includes a socket 408-1, which hosts various platform elements. These include a core 412-1, a last level cache 416-1, a main memory 420-1, and a PCIe agent 422-1. Note that in this example, for simplicity, LLC 416-1 and main memory 420-1 are illustrated as examples of different tiers of memory. These should be understood as nonlimiting examples, and other nonlimiting and illustrative examples of memory tiers may include L1 or L2 cache, high-bandwidth memory, double data rate (DDR) memory, PFM, RDMA, or any other tier of memory.

By way of illustration, tiers of memory may be defined according to their bandwidth and latency. For example, L1 and L2 cache may be located on-die, and may thus have very high bandwidth and very low latency. These may be considered the top tier of memory. LLC, such as LLC 416-1 may be considered a second tier of memory, with somewhat higher latency and lower bandwidth than the first-tier memory. HBM may be a third-tier memory, DDR may be a fourth tier, and RDMA may be a fifth tier, by way of nonlimiting and illustrative example. Also note that in this illustration, tiers of memory are stratified according to the unified principle of increasing bandwidth and decreasing latency. However, richer or more complex memory schemes and tiers may be defined according to the needs of a particular embodiment. For example, a very high bandwidth memory with relatively higher latency may be on a different tier from a memory with the same bandwidth but with relatively lower latency.

Node 404-1 couples to a fabric 470 via fabric interface 430-1. Fabric interface 430-1 may be, for example, a standalone PCIe add-on card, or may be an on-die tightly integrated fabric interface. In the case of an integrated fabric interface, fabric interface 430-1 may communicate with core 412-1 via a protocol such as PCIe, or via any other suitable bus or interconnect.

Node 404-2 also connects to fabric 470 via a fabric interface 430-2. Node 404-2 includes a pair of sockets 408-2 and 408-3 coupled via a local interconnect such as QPI.

As before, node 404-2 includes resources such as cores 412-2 and 412-3, LLC 416-2 and 416-3, memory 420-2 and 420-3, and PCIe agents 422-2 and 422-3.

By way of example, application 1 440 may need to communicate with application 2 442 via fabric 470. At operation 1, application 1 440 may issue an appropriate command such as a get command to application 2 440-2.

In accordance with DDIO principles, application 2 442 running on core 412-2 may retrieve the appropriate data, and write the data via fabric interface 430-2 to fabric 470, where it is routed to fabric interface 430-1 of node 404-1. At operation 3, in accordance with DDIO principles, fabric interface 430-1 writes the data directly to LLC 416-1.

In operation 4, core 412-1 may take ownership of the data in LLC 416-1, read the data from LLC 416-1, and consume the data.

The embodiment of FIG. 4 represents a substantial improvement over previous instances, wherein fabric interface 430-1 may write data to memory 420-1. For core 412-1 to retrieve the data, core 412-1 would have to fetch the data from memory into cache, and then read the data out of cache, which in many cases can take hundreds of processor cycles. In contrast, the DDIO embodiment of FIG. 4 may take only a few processor cycles for core 412-1 to consume the data once it has been written to LLC 416-1.

However, even this embodiment can be improved. Because the data are not tagged with any explicit attributes in this example, fabric interface 430-1 may rely on heuristic algorithms, or a very straightforward algorithm that all data are to be written to LLC 416-1. This means that in some cases, data that are not needed immediately may be written to LLC 416-1. This may cause more important data within LLC 416-1 to be evicted from LLC 416-1, and then the data sit in LLC 416-1 until they are also later evicted in place of other data. Finally, the data may be retrieved from memory 420-1 when they are needed, but inefficiencies may have been introduced in the meantime as more important data may have been evicted and may not have been usable.

Figure 5:
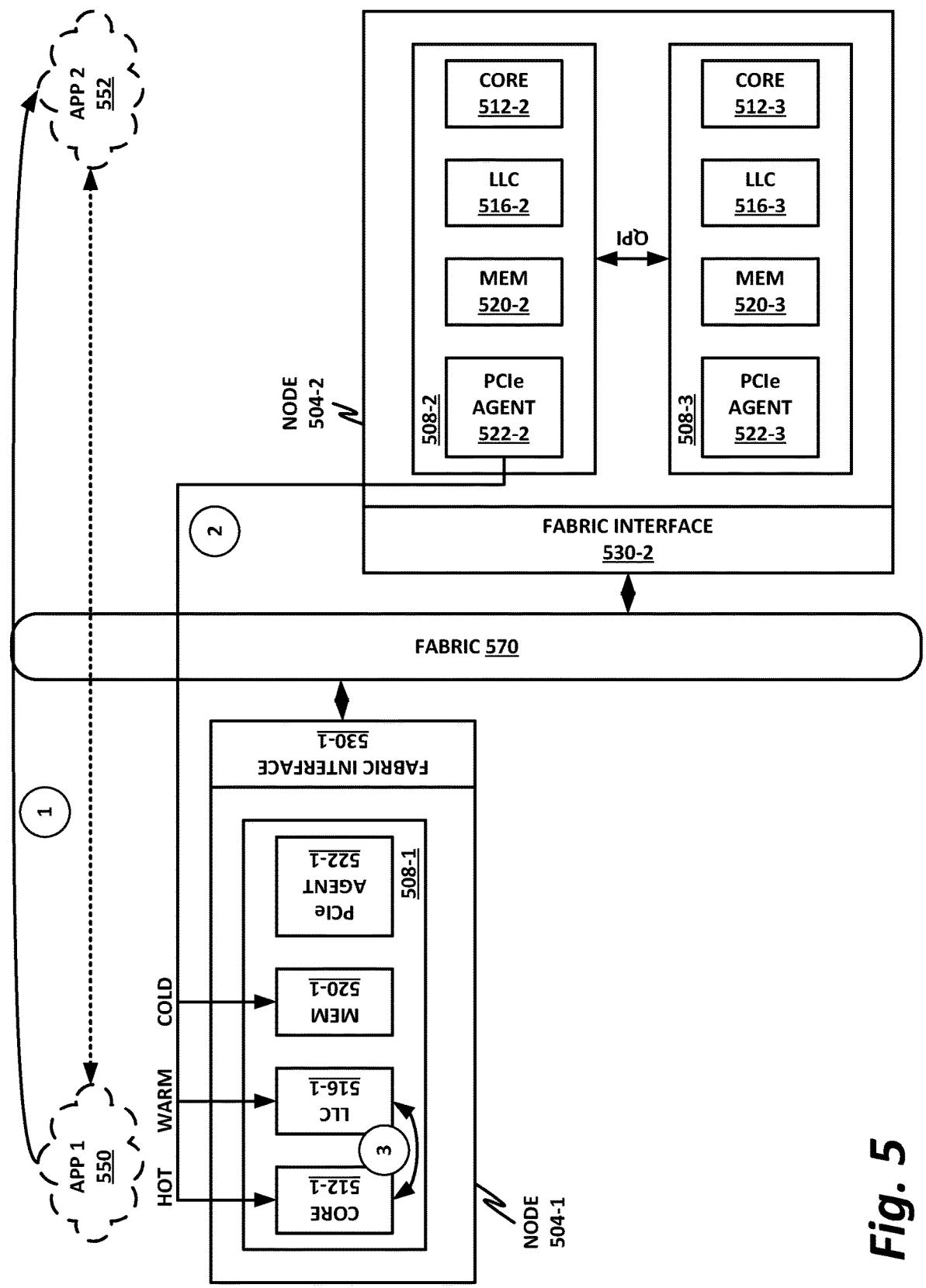
FIG. 5 is a further block diagram of selected aspects of a data center, according to one or more examples of the present specification.

FIG. 5 is a further block diagram of selected aspects of a data center, according to one or more examples of the present specification. In the example of FIG. 5, as in the example of FIG. 4, an application 1 550 communicates with an application 2 552 via fabric 570. As before, two nodes 504 are provided, each including a fabric interface 530, and one or more sockets 508. Sockets 508 include, by way of illustrative example, a core 512, LLC 516, memory 520, and PCIe agent 522. Nodes 504 communicate with fabric 570 via fabric interface 530.

In the example of FIG. 5, fabric interface 530-1 and fabric interface 530-2 are enhanced with extended put and get functionality, as described in this specification. In particular, when issuing a put or get, fabric interface 530 may be able to tag the packet with a data class, such as hot, warm, or cold by way of nonlimiting example. Fabric interface 530 may also have the ability to specify a preferred or optimal target location for the packet, such as memory 520-1, LLC 516-1, or an on-core L1 or L2 in core 512.

Thus, in an example, application 1 550 may need to communicate with application 2 552, such as by issuing a get. In operation 1, application 1 550 issues a get command, including, by way of example, an address, a data class, QoS hints, and a preferred target location. For example, application 1 550 may issue a get command with a target address, may mark the get as hot, may indicate that the response is to be stored in L2 cache, may indicate in the QoS hints a time that the data are to be retained in cache, such as an microseconds or milliseconds, and may provide a process ID of the process issuing the get.

At operation 2, core 512 receives the get command, and responds with a data packet. The response may be appropriately tagged, and may include a command such as write to L2, and include the process ID and QoS hints. When fabric interface 530-1 receives the response, it inspects the packet, translates the process ID to a CPU ID for core 512-1, and writes the data directly to the L2 cache of core 2 512-1.

In this example, an application may have greater visibility into and control over how the data are handled. The application can mark data as hot, warm, or cold, and may specify a preferred target. This ensures that the data are handled more efficiently, and avoids situations such as one where cold data are written directly to LLC 516, thus evicting hot data, thus requiring the hot data to eventually be read back out from memory 520, evicting the cold data to memory 520, and finally the cold data are later read from memory 520-1. Rather, the cold data are written directly to memory 520-1, the hot or warm data stay in LLC 516 without being evicted, and greater efficiency is realized.

Figure 6:
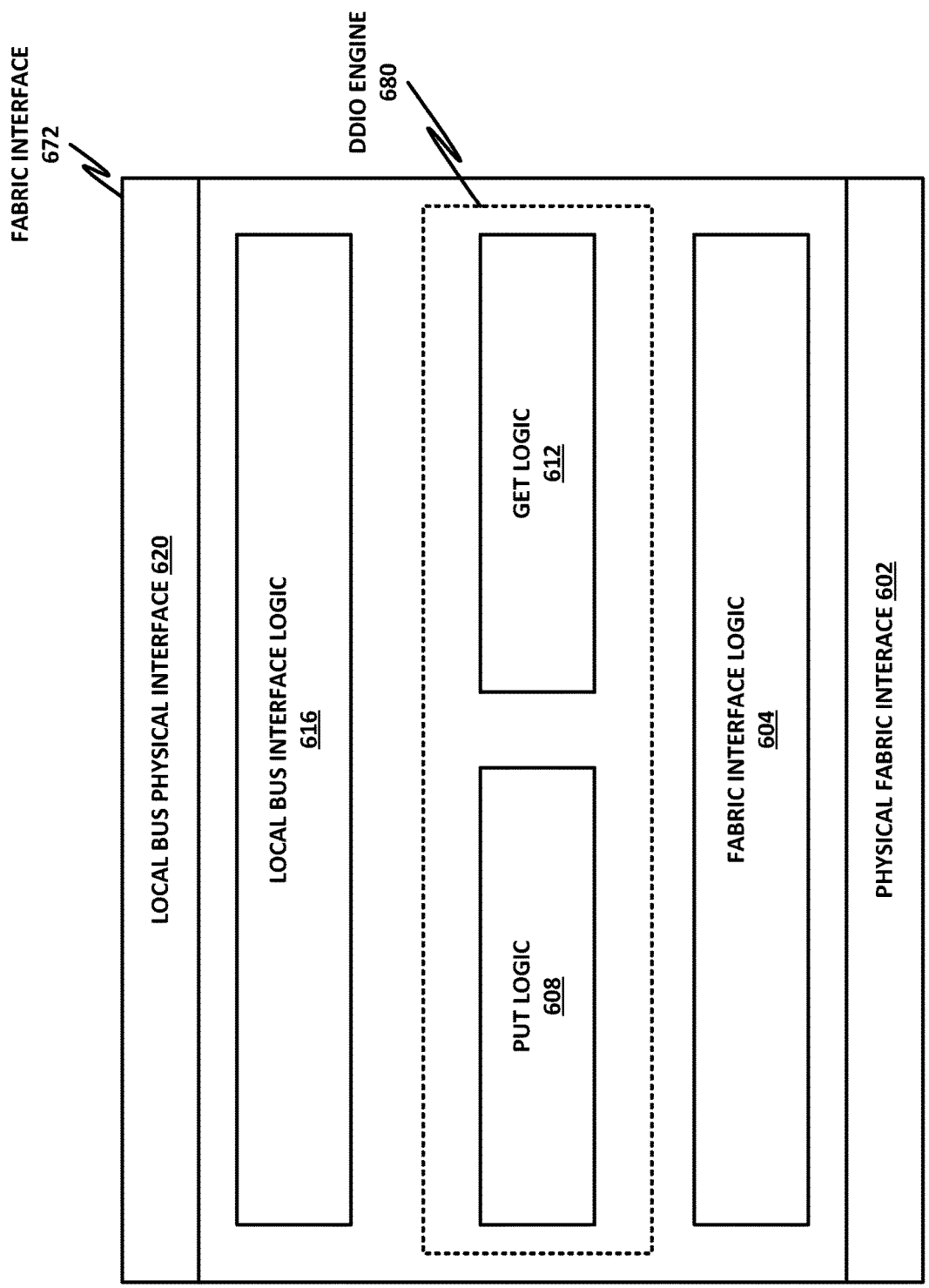
FIG. 6 is a block diagram of an example fabric interface, according to one or more examples of the present specification.

FIG. 6 is a block diagram of an example fabric interface 672, according to one or more examples of the present specification. This fabric interface 672 is provided by way of nonlimiting example only. It should be noted in particular that fabric interface 672 may be a separate pluggable card, such as a PCIe card, or it may be tightly integrated and on-die with its host core. Furthermore, while fabric interface 672 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on fabric interface 672 in this figure should be understood as a nonlimiting and illustrative example only, and the present disclosure should be understood to encompass any suitable hardware or software configuration for realizing remote hardware acceleration.

In this example, fabric interface 672 includes two physical interfaces, namely a local bus physical interface 620 and a physical fabric interface 602.

Local bus interface 620 may provide a physical interface to a local bus on the host, such as a PCIe interface or other local interconnect. Local bus physical interface 620 is provided as a nonlimiting example, and it should be understood that other interconnect methods are possible. For example, in cases where fabric interface 672 is tightly coupled with its accompanying core, local bus physical interface 620 could be direct, on-die trace lines, or direct copper connections on an integrated circuit board. In other examples, a bus interface other than PCIe could be used.

Physical fabric interface 602 provides the physical interconnect to a fabric, such as fabric 170 of FIG. 1 or any of the fabrics disclosed herein. Physical fabric interface 602 may be configured to connect fabric interface 672 to any suitable fabric.

In one particular example, the Intel® Omni-Path™ fabric may be used. The Omni-Path™ fabric is advantageous because it allows mapping of addresses and memory ranges between different coherent domains. A system may include one or more coherent domains wherein all coherent domains are connected to each other via a fabric. Caching agents (CAs) are the coherency agents within a node that process memory requests from cores within the same node, thus helping to manage the coherency of the domain. Home agents are node clusters that are responsible for processing memory requests from the CAs, and act as a home for part of the memory address space. A single die may have multiple homes, having a distributed address space mapping. Depending on the address space that the request targets, the request may go to the same node's local memory or they may go to a UPI agent, for example, to route the request to other processors within the same coherent domain. Alternately, a request may go through the fabric interface 672 to processors that are outside the coherent domain. All processors connected via the UPI belong to the same coherent domain. Thus, in one embodiment, fabric interface 672 may communicate with an Omni-Path™ fabric via UPI tunneling.

This communication may be facilitated via fabric interface logic 604, which provides logic elements and instructions necessary to provide communication within a coherent domain, and across the fabric with different coherent domains. Fabric interface logic 604 may also include logic to translate local requests into remote fabric requests.

On the other hand, local bus interface logic 616 may provide logic for interfacing with the local bus, such as a PCIe bus, or a dedicated copper connection. Alternately, traffic through fabric interface 672 may follow a path through local bus physical interface 620, local bus interface logic 616, fabric interface logic 604, and physical fabric interface 602 out to the fabric.

Fabric interface 672 also includes a DDIO policy agent 680. DDIO policy agent 680 may be implemented directly in hardware, such as with an ASIC or ROM, may include a programmable element, such as an FPGA, or may include a more generally programmable processor with memory, and instructions that may be stored on a tangible, non-transitory, computer readable medium, such as a ROM, flash drive, or disk.

DDIO policy agent 680 includes both put logic 608 and get logic 612.

Put logic 608 includes logic for executing put commands, but also may include additional logic. For example, put logic 608 may include logic for executing a put, which may include the ordinary put fields, and which may also include, by way of nonlimiting example, additional fields such as:

A data class for the message (e.g., hot, warm, or cold).
An optimal intended target for where the data should be stored (e.g., L1 or L2, LLC, HBM, DDR, or even a remote memory such as persistent fast memory (PFM) or remote direct memory access (RDMA)).
QoS hints. For example, these may indicate when the data may be safely evicted.
A process ID, which may be used in cases where the data are to be stored in a core where a given process ID is running.

Similarly, get logic 612 includes logic for issuing get commands, which may include the ordinary fields of the get command, which may also include, by way of nonlimiting example, additional fields such as:

A data class for the message (e.g., hot, warm, or cold).
An optimal intended target for where the data should be stored (e.g., L1 or L2, LLC, HBM, DDR, or even a remote memory such as persistent fast memory (PFM) or remote direct memory access (RDMA)).
QoS hints. For example, these may indicate when the data may be safely evicted.
A process ID, which may be used in cases where the data are to be stored in a core where a given process ID is running.

In some examples, local bus interface logic 616 may also be extended. For example, local bus interface logic 616 may include logic for issuing a number of write commands that can be driven by DDIO policy agent 680. For example, if a get is issued with a preferred target such as memory of a certain tier, local bus interface logic 616 may include logic to implement several write commands, such as "write to L1," "write to L2," "write to LLC," "write to DDR," "write to HBM," or "write to RDMA."

Figure 7:
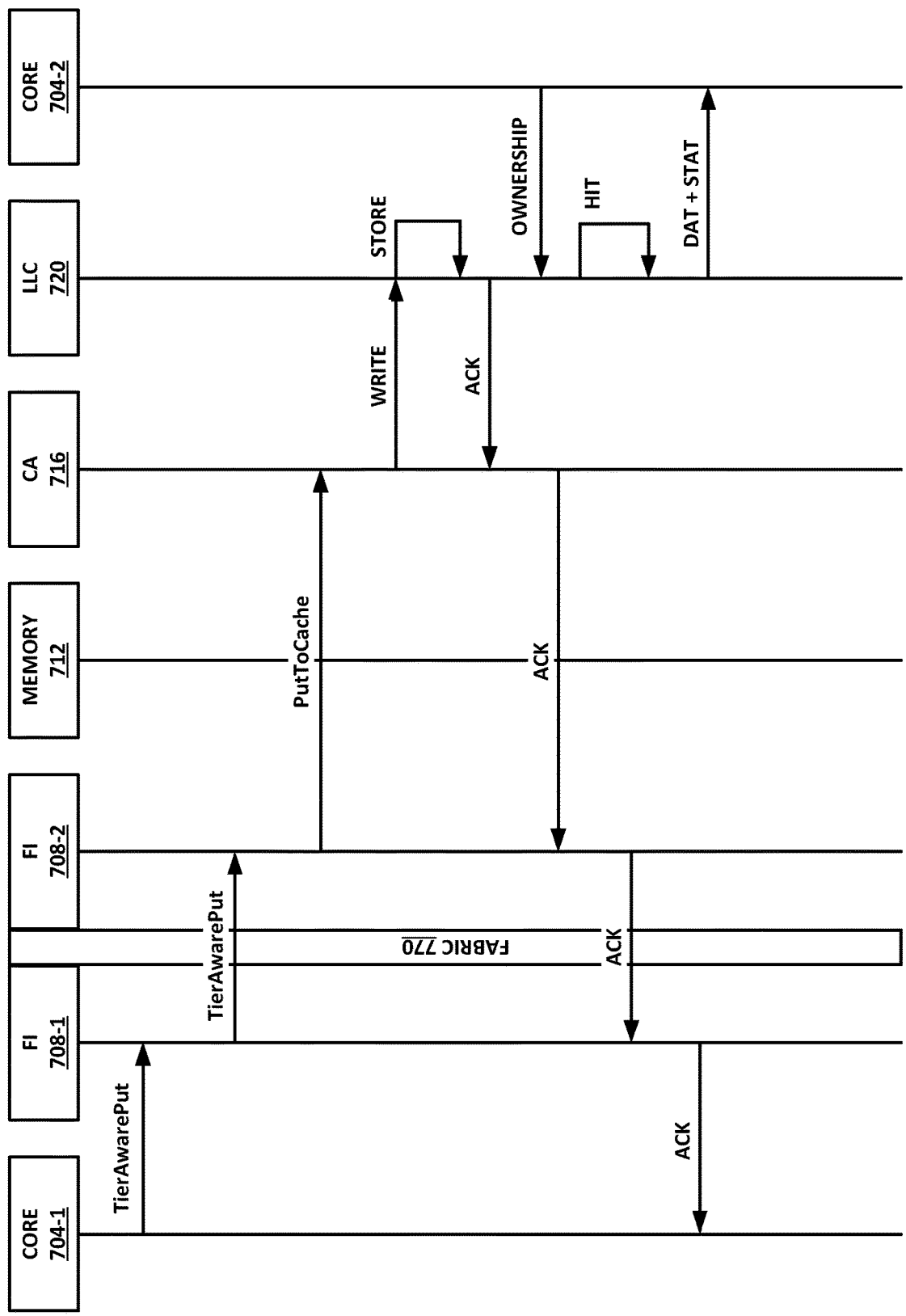
FIGS. 7-9 are signal flow diagrams illustrating novel put flows, according to one or more examples of the present specification.
Figure 8:
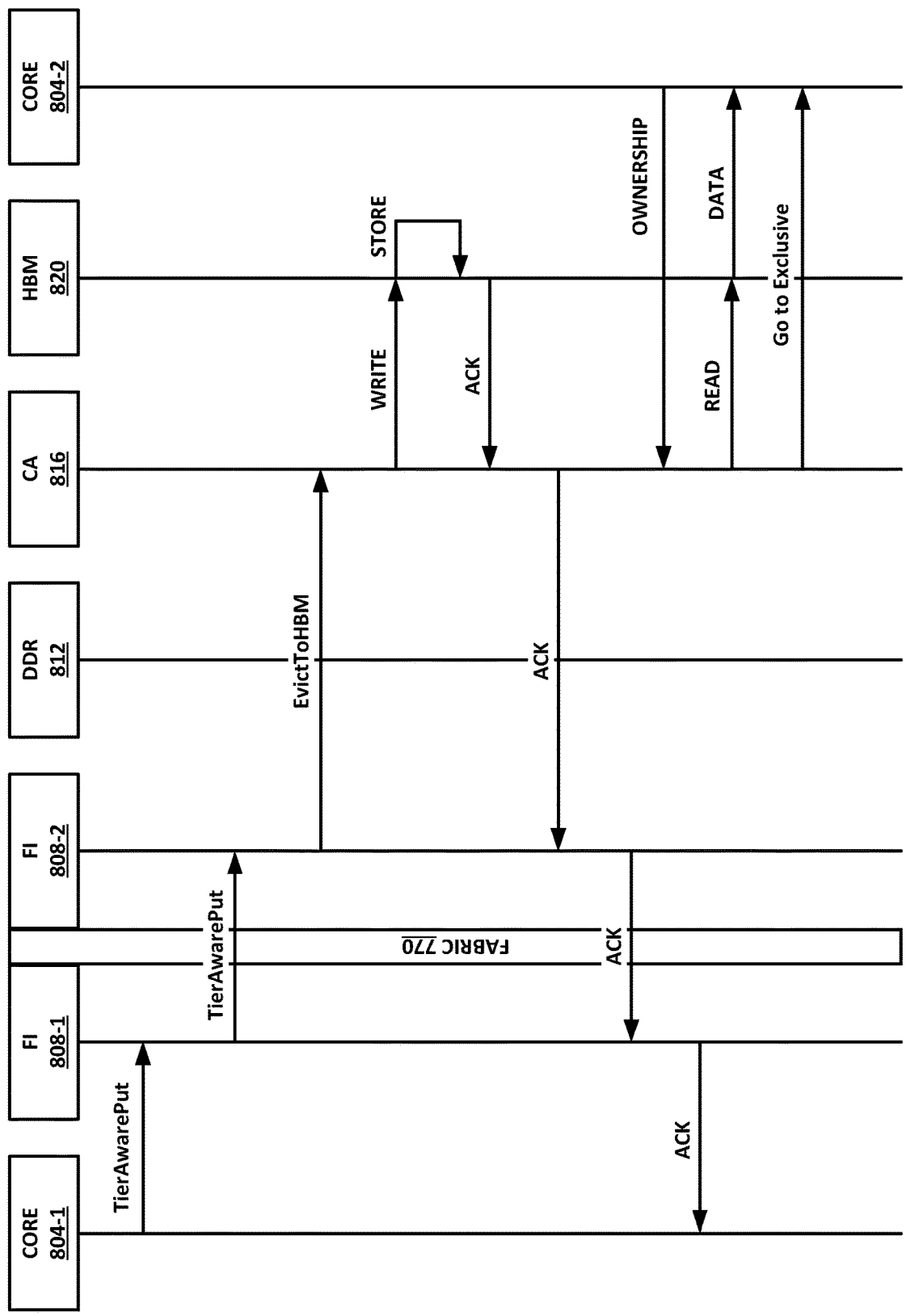
Figure 9:
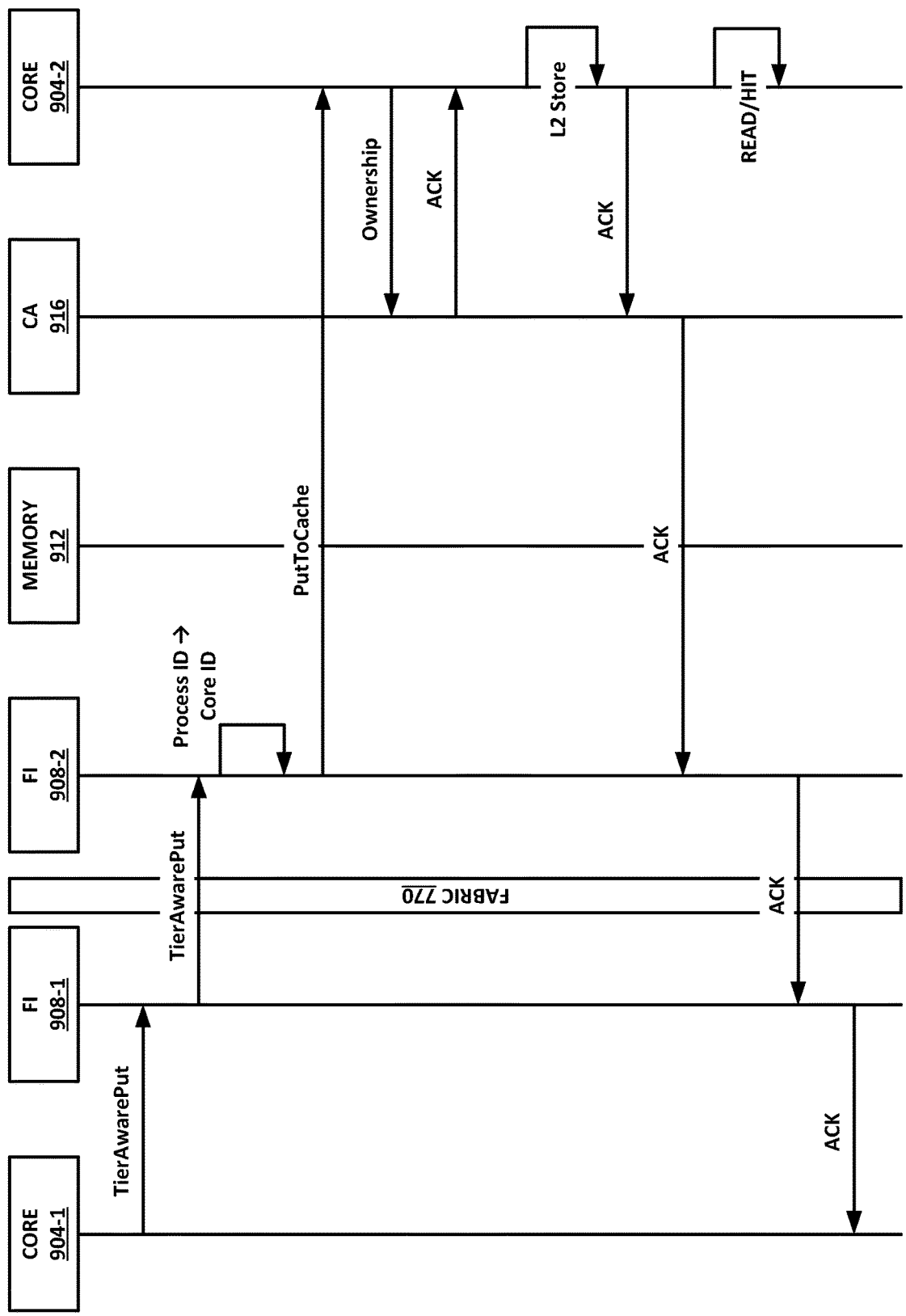
Figure 10:
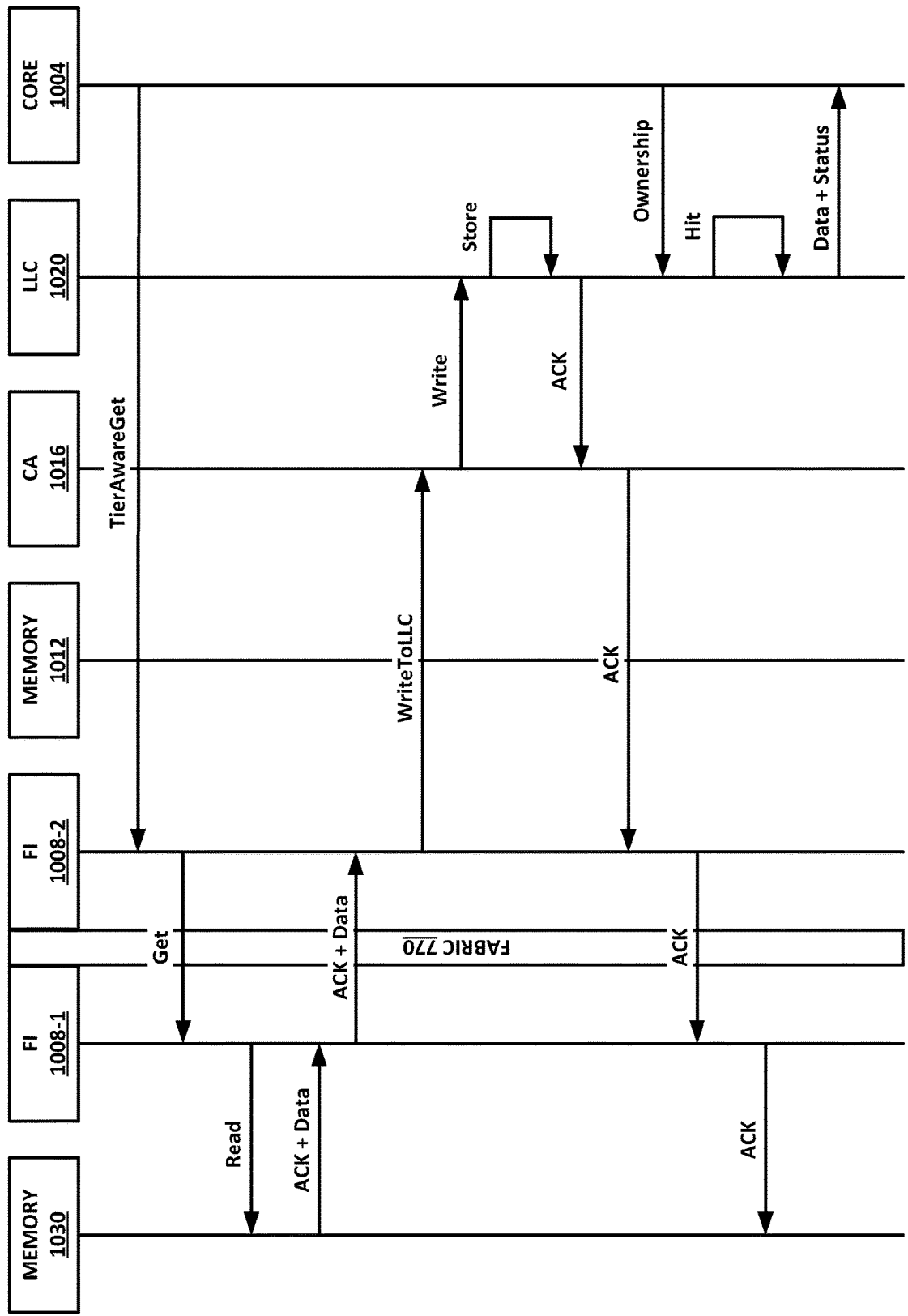
FIG. 10 is a signal flow diagram illustrating a novel get flow, according to one or more examples of the present specification.

FIGS. 7-9 are signal flow diagrams illustrating novel put flows, according to one or more examples of the present specification. FIG. 10 is a signal flow diagram illustrating a novel get flow according to one or more examples of the present specification. The flows illustrated in FIGS. 7 through 10 are provided as nonlimiting and illustrative examples of flows that may be implemented to realize the teachings of the present specification. In other embodiments, other flows may be used to realize the same functions. Furthermore, the examples of put and get operations disclosed in these flows should be understood to be nonlimiting examples of data transfer flows according to the present specification. In various embodiments, other put and get flows may be implemented under the same principles disclosed herein.

In the example of FIG. 7, a core 704-1 running on a first node issues a tier-aware put operation for a core 704-2 running on a second node. Core 704-1 communicates with fabric 470 via fabric interface 708-1. Core 704-2 communicates with fabric 770 via fabric interface 708-2. Core 708-2 also includes different tiers of memory, including a main memory 712, and an LLC 720. LLC 720 is managed by a CA 716.

Core 704-1 issues a tier-aware put command to fabric interface 708-1. Parameters of the tier-aware put command may include, for example, a pointer to the put location ("@X"), a preferred memory tier (for example, in this case, "warm"), a preferred target (LLC), a process ID, and optionally QoS hints.

Fabric interface 708-1 receives the tier-aware put and issues the tier-aware put via fabric 770 to fabric interface 708-2.

Fabric interface 708-2 parses the incoming command, determines that the payload should be directed to LLC 720, and issues a put to cache command to CA 716. Parameters for the put to cache command may include @X as well as QoS hints, by way of example.

CA 716 issues a write command to LLC 720. Parameters for the write command may include @X.

LLC 720 stores the payload data in address X within LLC 720. LLC 720 then issues an ACK to CA 716, and the ACK is propagated from CA 716 to FI 708-2, FI 708-1, and core 704-1. Note that these ACKs may be identical ACKs, or they may be different ACKs according to the properties of the various components.

The warm data are now stored within LLC 720, and are ready for consumption by core 704-2.

When core 704-2 is ready to consume the data, core 704-2 takes ownership of address X on LLC 720. LLC 720 looks for a tag matching the requested address, and if it is found then there is a cache hit. LLC 720 then returns the data as well as a status indicator to core 704-2. Core 704-2 can then consume the data.

As the flow of FIG. 7 advantageously illustrates, an application running on core 704-1 can have visibility into the tier-aware put operation, and may thus be able to determine or at least preferentially request a particular target for the put. Thus, the tier-aware put places data in address X on LLC 720 where it can be timely consumed, but does not, for example, place the data on core L2 cache, where it could evict more time sensitive data.

FIG. 8 is a signal flow diagram of a tier-aware put to a high bandwidth memory according to one or more examples of the present specification. The tier-aware put of FIG. 8 may include the same parameters as the tier-aware put of FIG. 7, e.g., a pointer to the put location (@X), a preferred memory tier (in this case, "warm"), a preferred target (LLC), a process ID, and optionally QoS hints. As before, core 804-1 is to put data to core 804-2. The compute nodes are connected via fabric 770 and via fabric interfaces 808-1 and 808-2. In this example, the second node includes a DDR main memory 812, a CA 816, and a high-bandwidth memory (HBM) 820. HBM 820 may be considered to be a memory tier above DDR 812, but possibly below LLC or on-core L1 or L2 cache.

As before, core 804-1 issues a tier-aware put via fabric interface 808-1. Fabric interface 808-1 propagates the tier-aware put to fabric 770, and to fabric interface 808-2.

Fabric interface 808-2 inspects the incoming packet and determines that the appropriate action in this case is evict to HBM. Thus, fabric interface 808-2 issues an evict to HBM to CA 816. Parameters for evict to HBM may include, for example, the address of X, and QoS hints.

CA 816 receives the evict to HBM command, and issues a write command to address X of HBM 820.

HBM 820 stores the data in address X of HBM 820. HBM 820 then issues an ACK back to CA 816, and the ACK is propagated to FI 808-2, FI 808-1, and core 804-1. As before, these ACKs may be identical, or may be crafted to the particular devices.

The data are now located within HBM 820 and are ready for consumption by core 804-2. When core 804-2 is ready to consume the data, it issues an ownership of address X to CA 816. CA 816 issues a read to HBM 820 with address X, and HBM 820 returns the data to core 804-2. To maintain coherency, CA 816 also issues a go to exclusive to core 804-2 for address X.

Note that a similar operation could be used to place data, for example, in main memory or DDR 812, and in other memory locations such as the RDMA. Crafting an appropriate tier-aware put for a particular memory location is an exercise of skill that may be ordinarily performed in implementing the teachings of the present specification on a particular platform.

FIG. 9 is an illustration of a tier-aware put wherein data are placed directly into cache on a core, such as L1 or L2 cache.

As before, core 904-1 is issuing a put to core 904-2. Core 904-1 communicates with fabric 770 via fabric interface 908-1. Core 904-2 communicates with fabric 770 via fabric interface 908-2. Core 904-2 also includes a main memory 912, and a CA 916 to provide coherency for caches such as LLC or L1 and L2 cache.

In this example, core 904-1 issues a tier-aware put. Parameters for the tier-aware put of FIG. 9 may include, for example, a pointer to the put location (@X), a preferred memory tier (in this case, "warm"), a preferred target (L1 or L2 on-core cache), a process ID, and optionally QoS hints. Fabric interface 908-1 propagates the tier-aware put via fabric 770 to fabric interface 908-2.

Because this is a put directly to on-core cache, to direct the data to the appropriate core, fabric interface 908-2 translates the process ID into a core ID, such as by querying a process table to determine which core the process is running on. Fabric interface 908-2 now knows which core is hosting the process and thus needs the data. Fabric interface 908-2 bypasses memory 912 and CA 916, and issues a direct put to cache to core 904-2.

Upon receiving the put to cache command, to maintain coherency, core 904-2 requests ownership via CA 916. CA 916 issues an ACK, thereby acknowledging that core 904-2 has ownership of the data location.

Core 904-2 may now store the data on its onboard L1 or L2 cache as requested.

Core 904-2 then issues an ACK back to CA 916, and CA 916 propagates the ACK back to FI 908-2, FI 908-1, and core 904-1. As before, the ACKs may be identical, or may be crafted to the particular context.

When 904-2 is ready to consume the data, it issues a cache read to its L1 or L2 cache. Because the data are stored in the cache, the cache read is a hit, and the core may consume the data. Note that in this example, because the data are stored directly in onboard cache, consumption of the data may take only one to a very few clock cycles.

FIG. 10 is a signal flow diagram of a tier-aware get operation, according to one or more examples of the present specification.

As before, core 1004 needs to get data from memory 1030 of a different node. Core 1004 is communicatively coupled to fabric 770 via fabric interface 1008-2, and the node hosting memory 1030 is communicatively coupled to fabric 770 via fabric interface 1008-1. Note that this node may also include other features, such as a processor or other support functions. However, in other examples, this may be a dedicated memory server, and does not provide processing capabilities. The selected elements shown in the signal flow diagram are selected for the sake of simplicity and to illustrate operational principles of the present specification.

In this example, core 1004 issues a tier-aware get to fabric interface 1008-2. Parameters for the tier-aware get may include, for example, the address of the data to be requested (@X), a data classifier such as hot, warm, or cold, QoS hints, and a preferred destination for the return data to be written to, such as in this example LLC 1020.

Fabric interface 1008-2 issues a get directed to the address at X to fabric interface 1008-1. Note that in this example, fabric interface 1008-1 need not be aware that this is a tier-aware get operation, and need not provide any special processing. Rather, fabric interface 1008-1 will simply read the data from the appropriate address, and return it to fabric interface 1008-2. All of the tier-aware functionality can in this example be handled by fabric interface 1008-2.

Fabric interface 1008-1 issues a read to memory 1030. Memory 1030 returns an acknowledgment along with the requested data to fabric interface 1008-1.

Fabric interface 1008-1 returns an acknowledgment along with the requested data to fabric interface 1008-2.

Because fabric interface 1008-2 is aware that this return belongs to a tier-aware get flow, fabric interface 1008-2 is also aware of the parameters that were provided in the tier-aware get command. Thus, fabric interface 1008-2 determines that the appropriate action is a write to LLC command.

Fabric interface 1008-2 issues a write to LLC command to caching agent 1016, with parameters such as @X and the QoS hints.

Caching agent 1016 issues a write to LLC 1020 for address X.

LLC 1020 stores the data in @X.

LLC 1020 then issues an ACK back to CA 1016. CA 1016 propagates the ACK to FI 1008-2, FI 1008-1, and memory 1030. As before, these ACKs may be identical, or may be crafted to the particular context.

When core 1004 is prepared to consume the data, it issues an ownership request to LLC 1020.

LLC 1020 searches for a matching tag, and determines that the requested data are stored in LLC 1020. This generates a cache hit.

LLC 1020 then returns the data along with a status identifier to core 1004. Core 1004 may now consume the data.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

Example 1 includes a fabric interface apparatus, comprising: a fabric interface logic to communicatively couple to a fabric; a data interface to communicatively couple to a compute platform comprising memory resources in at least two memory tiers; and a tier-aware read/write engine (TARWE) to: receive an incoming packet via the fabric; parse a header of the incoming packet to identify a hint for directing the incoming packet to a preferred memory tier; and write the incoming packet to the preferred memory tier.

Example 2 includes the fabric interface apparatus of example 1, wherein the hint comprises a priority tag.

Example 3 includes the fabric interface apparatus of example 1, wherein the hint comprises a preferred memory tier, and wherein the TARWE is further to determine that writing to the preferred memory tier is feasible.

Example 4 includes the fabric interface apparatus of example 3, wherein the TARWE is further to determine that writing to the preferred memory tier is not feasible, and to write to a best feasible memory tier.

Example 5 includes the fabric interface apparatus of example 1, wherein the hint comprises a quality of service (QoS) hint.

Example 6 includes the fabric interface apparatus of example 5, wherein the TARWE is to retain the incoming packet in the preferred memory tier for a time according to the QoS hint.

Example 7 includes the fabric interface apparatus of any of examples 1-6, wherein the TARWE is further to: generate a packet; determine a second preferred memory tier for the packet; add a header to the packet comprising a second hint for the second preferred memory tier; and send the packet via the fabric.

Example 8 includes the fabric interface of example 7, wherein the second hint comprises a priority tag.

Example 9 includes the fabric interface apparatus of example 7, wherein the second hint comprises a preferred memory tier.

Example 10 includes the fabric interface apparatus of example 7, wherein the hint comprises a quality of service hint.

Example 11 includes the fabric interface of example 1, wherein the preferred memory tier comprises a last-level cache (LLC).

Example 12 includes the fabric interface of example 1, wherein the preferred memory tier comprises high-bandwidth memory (HBM).

Example 13 includes the fabric interface of example 1, wherein the preferred memory tier comprises main memory.

Example 14 includes the fabric interface of example 1, wherein the preferred memory tier comprises on-core L1 or L2 cache.

Example 15 includes one or more tangible, non-transitory computer-readable mediums having stored thereon instructions for causing a hardware platform to provide a tier-aware read/write engine (TARWE), that TARWE to: communicatively couple to a fabric; communicatively couple to a compute platform comprising memory resources in at least two memory tiers; and receive an incoming packet via the fabric; parse a header of the incoming packet to identify a hint for directing the incoming packet to a preferred memory tier; and write the incoming packet to the preferred memory tier.

Example 16 includes the one or more tangible, non-transitory computer-readable mediums of example 15, wherein the hint comprises a priority tag.

Example 17 includes the one or more tangible, non-transitory computer-readable mediums of example 15, wherein the hint comprises a preferred memory tier, and wherein the TARWE is further to determine that writing to the preferred memory tier is feasible.

Example 18 includes the one or more tangible, non-transitory computer-readable mediums of example 17, wherein the TARWE is further to determine that writing to the preferred memory tier is not feasible, and to write to a best feasible memory tier.

Example 19 includes the one or more tangible, non-transitory computer-readable mediums of example 15, wherein the hint comprises a quality of service (QoS) hint.

Example 20 includes the one or more tangible, non-transitory computer-readable mediums of example 19, wherein the TARWE is to retain the incoming packet in the preferred memory tier for a time according to the QoS hint.

Example 21 includes the one or more tangible, non-transitory computer-readable mediums of any of examples 15-20, wherein the TARWE is further to: generate a packet; determine a second preferred memory tier for the packet; add a header to the packet comprising a second hint for the second preferred memory tier; and send the packet via the fabric.

Example 22 includes the one or more tangible, non-transitory computer-readable mediums of example 21, wherein the second hint comprises a priority tag.

Example 23 includes the one or more tangible, non-transitory computer-readable mediums of example 21, wherein the second hint comprises a preferred memory tier.

Example 24 includes the one or more tangible, non-transitory computer-readable mediums of example 21, wherein the hint comprises a quality of service hint.

Example 25 includes the one or more tangible, non-transitory computer-readable mediums of example 21, wherein the hint comprises a quality of service hint.

Example 26 includes the one or more tangible, non-transitory computer-readable mediums of example 15, wherein the preferred memory tier comprises high-bandwidth memory (HBM).

Example 27 includes the one or more tangible, non-transitory computer-readable mediums of example 15, wherein the preferred memory tier comprises main memory.

Example 28 includes the one or more tangible, non-transitory computer-readable mediums of example 15, wherein the preferred memory tier comprises on-core L1 or L2 cache.

Example 29 includes a computer-implemented method of providing a tier-aware read/write engine (TARWE), comprising communicatively coupling to a fabric; communicatively coupling to a compute platform comprising memory resources in at least two memory tiers; and receiving an incoming packet via the fabric; parsing a header of the incoming packet to identify a hint for directing the incoming packet to a preferred memory tier; and writing the incoming packet to the preferred memory tier.

Example 30 includes the method of example 29, wherein the hint comprises a priority tag.

Example 31 includes the method of example 29, wherein the hint comprises a preferred memory tier, and further comprising determining that writing to the preferred memory tier is feasible.

Example 32 includes the method of example 31, further comprising determining that writing to the preferred memory tier is not feasible, and to write to a best feasible memory tier.

Example 33 includes the method of example 29, wherein the hint comprises a quality of service (QoS) hint.

Example 34 includes the method of example 33, further comprising retaining the incoming packet in the preferred memory tier for a time according to the QoS hint.

Example 35 includes the method of any of examples 29-34, further comprising: generating a packet; determining a second preferred memory tier for the packet; adding a header to the packet comprising a second hint for the second preferred memory tier; and sending the packet via the fabric.

Example 36 includes the method of example 35, wherein the second hint comprises a priority tag.

Example 37 includes the method of example 35, wherein the second hint comprises a preferred memory tier.

Example 38 includes the method of example 35, wherein the hint comprises a quality of service hint.

Example 39 includes the method of example 35, wherein the preferred memory tier comprises a last-level cache (LLC).

Example 40 includes the method of example 29, wherein the preferred memory tier comprises high-bandwidth memory (HBM).

Example 41 includes the method of example 29, wherein the preferred memory tier comprises main memory.

Example 42 includes the method of example 29, wherein the preferred memory tier comprises on-core L1 or L2 cache.

Example 43 includes an apparatus comprising means for performing the method of any of examples 29-42.

Example 44 includes the apparatus of example 43, wherein the means for performing the method comprise a processor and a memory.

Example 45 includes the apparatus of example 44, wherein the memory comprises machine-readable instructions, that when executed cause the apparatus to perform the method of any of examples 29-42.

Example 46 includes the apparatus of any of examples 43-45, wherein the apparatus is a computing system.

Example 47 includes at least one computer readable medium comprising instructions that, when executed, implement a method or realize an apparatus as illustrated in any of examples 29-46.

What is claimed is:

1. A fabric interface apparatus, comprising:
   a fabric interface to communicatively couple to a fabric;
   a peripheral component interconnect express (PCIe) bus to couple to a local compute platform comprising memory resources in at least two memory tiers, comprising at least two levels of local cache; and
   circuitry to:
   receive an incoming packet via the fabric;
   parse a header of the incoming packet to identify a hint for directing the incoming packet to a preferred memory tier, wherein the preferred memory tier is a level of local cache;
   write the incoming packet to the preferred memory tier;
   generate an outgoing packet, comprising an identification of a preferred memory tier for the outgoing packet; and
   send the outgoing packet via the fabric.

2. The fabric interface apparatus of claim 1, wherein the hint comprises a priority tag.

3. The fabric interface apparatus of claim 1, wherein the hint comprises a preferred memory tier, and wherein the circuitry is further to determine that writing to the preferred memory tier is feasible.

4. The fabric interface apparatus of claim 3, wherein the circuitry is further to determine that writing to the preferred memory tier is not feasible, and to write to a best feasible memory tier.

5. The fabric interface apparatus of claim 1, wherein the hint comprises a quality of service (QoS) hint.

6. The fabric interface apparatus of claim 5, wherein the circuitry is to retain the incoming packet in the preferred memory tier for a time according to the QoS hint.

7. The fabric interface apparatus of claim 1, wherein the second hint comprises a priority tag.

8. The fabric interface apparatus of claim 1, wherein the second hint comprises a preferred memory tier.

9. The fabric interface apparatus of claim 1, wherein hint comprises a quality of service hint.

10. The fabric interface apparatus of claim 1, wherein the preferred memory tier comprises a last-level cache (LLC).

11. The fabric interface apparatus of claim 1, wherein the preferred memory tier comprises high-bandwidth memory (HBM).

12. The fabric interface apparatus of claim 1, wherein the preferred memory tier comprises main memory.

13. The fabric interface apparatus of claim 1, wherein the preferred memory tier comprises on-core L1 or L2 cache.

14. One or more tangible, non-transitory computer-readable mediums having stored thereon instructions for causing a hardware platform to:
communicatively couple to a network fabric;
communicatively couple, via a peripheral component interconnect express (PCIe) bus, to a local compute platform comprising memory resources in at least two memory tiers, comprising at least two levels of cache;
receive an incoming packet via the network fabric;
parse a header of the incoming packet to identify a hint for directing the incoming packet to a preferred memory tier selected from the at least two levels of cache;
write the incoming packet to the preferred memory tier,
generate an outgoing packet, comprising an identification of a preferred memory tier for the outgoing packet; and
send the outgoing packet via the fabric.

15. The one or more tangible, non-transitory computer-readable mediums of claim 14, wherein the hint comprises a priority tag.

16. The one or more tangible, non-transitory computer-readable mediums of claim 14, wherein the hint comprises a preferred memory tier, and wherein the instructions are further to determine that writing to the preferred memory tier is feasible.

17. The one or more tangible, non-transitory computer-readable mediums of claim 16, wherein the instructions are further to determine that writing to the preferred memory tier is not feasible, and to write to a best feasible memory tier.

18. The one or more tangible, non-transitory computer-readable mediums of claim 14, wherein the hint comprises a quality of service (QoS) hint.

19. The one or more tangible, non-transitory computer-readable mediums of claim 18, wherein the instructions are further to retain the incoming packet in the preferred memory tier for a time according to the QoS hint.

20. A computer-implemented method of providing tier-aware read/write operations to a plurality of levels of local cache, comprising:
communicatively coupling to a fabric;
communicatively coupling, via a peripheral component interconnect (PCIe) bus to a local compute platform comprising memory resources in at least two memory tiers, two or more levels of cache;
receiving an incoming packet via the fabric;
parsing a header of the incoming packet to identify a hint for directing the incoming packet to a preferred memory tier selected from among the two or more levels of cache;
writing the incoming packet to the preferred memory tier;
generating an outgoing packet having an identification of a preferred memory tier for the outgoing packet; and
sending the outgoing packet via the fabric.

21. The method of claim 20, wherein the hint comprises a priority tag.

22. The method of claim 20, wherein the hint comprises a preferred memory tier, and further comprising determining that writing to the preferred memory tier is feasible.

23. The method of claim 22, further comprising determining that writing to the preferred memory tier is not feasible, and to write to a best feasible memory tier.

* * * * *